(12) United States Patent
Shih et al.

(10) Patent No.: US 11,709,723 B2
(45) Date of Patent: Jul. 25, 2023

(54) CLOUD SERVICE FRAMEWORK

(71) Applicant: VMware, Inc., Palo Alto, CA (US)

(72) Inventors: Chiao-Chuan Shih, San Jose, CA (US); Himanshu Pandey, San Jose, CA (US); Joy Ghosh, Fremont, CA (US); Natalie Schlechter, Portland, OR (US)

(73) Assignee: VMWARE, INC., Palo Alto, CA (US)

( * ) Notice: Subject to any disclaimer, the term of this patent is extended or adjusted under 35 U.S.C. 154(b) by 7 days.

(21) Appl. No.: 17/574,896

(22) Filed: Jan. 13, 2022

(65) Prior Publication Data

US 2023/0061701 A1 Mar. 2, 2023

Related U.S. Application Data

(60) Provisional application No. 63/235,930, filed on Aug. 23, 2021.

(51) Int. Cl.
*G06F 9/54* (2006.01)

(52) U.S. Cl.
CPC ............. *G06F 9/547* (2013.01); *G06F 9/542* (2013.01)

(58) Field of Classification Search
CPC ....................................................... G06F 9/541

USPC .......................................................... 719/328
See application file for complete search history.

(56) References Cited

U.S. PATENT DOCUMENTS

| 11,275,624 | B2* | 3/2022 | Danielsson | G06F 8/65 |
| 11,429,464 | B2* | 8/2022 | Raheja | G06F 9/547 |
| 2017/0142157 | A1* | 5/2017 | Cao | H04L 63/1433 |
| 2019/0052643 | A1* | 2/2019 | Doshi | G06N 5/04 |
| 2019/0132222 | A1* | 5/2019 | Son | H04L 47/781 |
| 2021/0406044 | A1* | 12/2021 | Russell | G06F 3/04842 |
| 2022/0391189 | A1* | 12/2022 | Padubidri | G06F 8/60 |

* cited by examiner

*Primary Examiner* — Andy Ho
(74) *Attorney, Agent, or Firm* — Thomas Horstemeyer, LLP (57) ABSTRACT

Aspects of a cloud service framework are described. In some examples, a noncompliance event is received. The noncompliance event is identified using parameters detected from a deployment of hardware resources and software resources provided by a cloud service according to a service level agreement (SLA). An application programming interface (API) associated with the noncompliance event is identified. The API is disabled by updating an API availability status. A request to invoke the API is received, and the API is prevented from being forwarded to a backend service that provides the API.

20 Claims, 7 Drawing Sheets

CLOUD SERVICE FRAMEWORK

CROSS-REFERENCE TO RELATED APPLICATIONS

This application claims priority to, and the benefit of, U.S. Provisional Application No. 63/235,930, filed on Aug. 23, 2021, and entitled "CLOUD SERVICE FRAMEWORK," which is hereby incorporated herein by reference in its entirety.

BACKGROUND

Enterprises can utilize cloud services to run a customized set of applications. Different enterprise customers can subscribe to different levels of services to meet the needs of their specific applications. Cloud service providers including multi-cloud and hybrid-cloud environments should provide cloud services that comport with the requested quality of service according to the subscription level.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure describes a cloud service framework. The framework can provide policy-based subscription cloud service, deployment, compliance check, and remediation, among other functionalities. Enterprises can utilize cloud services to run a customized set of applications and functionalities. The functionalities can include one or more application programming interfaces (APIs). Different enterprise customers can subscribe to different levels of services to meet the needs of their specific applications. Cloud service providers can provide cloud services that comport with the requested quality of service according to the subscription level. A subscriber-based cloud service model is described, where different customers can subscribe to differentiated services to fit their own application needs. With a pay-as-one-go approach, the cloud service framework can be deployed with respect to the service policy of various predefined and customizable quality levels. The cloud service framework can ensure Quality of Service (QoS) and Service Level Agreement (SLA) going forward. The cloud service framework can include an application programming interface (API) toggling functionality that suspends or disables APIs based on noncompliance events. This API toggling functionality can be utilized in concert with remedial actions to more quickly and effectively bring services back into compliance when there is a noncompliance event.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

The cloud service framework can include the ability to discriminatingly deploy a subscription-based cloud service that is compliantly delivered with a specified policy for a customer. The cloud service framework can include the ability to automatically trigger policy compliance check in an on-going basis. The service can include the ability to isolate an identified anomaly or security breach and contain the damage before it's resolved. The cloud service framework can include the ability to dynamically manage the scope of micro service support via event-driven toggling or disabling/enabling of REST APIs based on compliance checks. The cloud service framework can include the ability to autonomously notify SLA breakage and remediate noncompliances to restore SLA QoS. For example, the cloud service framework can identify anomalous activity, security breaches, and other trigger events; disable one or more REST APIs that are affected by or associated with the trigger event; automatically or manually identify and implement one or more remedial actions; verify that the previously identified anomalies are corrected and that compliance is restored; and automatically re-enable the REST APIs that were toggled off to restore full service.

The cloud service framework can transmit a notification to information technology personnel to perform a remedial action that requires physical actions. The cloud service framework can also transmit a notification that previously identified anomalies are corrected and that compliance is restored, and request that an administrator re-enable the REST APIs that were toggled off. Notifications of each action that is automatically performed can be provided. Notifications can be transmitted to a client device and can be provided through a console user interface accessed using a client device.

The cloud service framework can provide cloud services that include but are not limited to VMware Cloud Foundation™ (VCF) which is VMware's unified Software-Defined Data Center (SDDC) cloud platform. VCF can incorporate VMware vSphere®, VMware vSAN™, VMware NSX®, VMware vRealize® Log Insight™, VMware vSphere® Replication™, VMware Site Recovery Manager, etc. into a natively integrated stack, delivering enterprise-ready cloud infrastructure with unique automation and management capabilities for a consistent operational experience across multiple clouds. The cloud service framework can include dependencies among software components, various VMware products, and multi-SKU supports. Customer services can be deployed and hosted on the cloud environments created by VCF. A cloud computing environment can include a physical infrastructure including compute, storage, network, and security compliance capabilities. The cloud service framework can integrate hardware and software components to work collaboratively to deliver and guarantee the respective services according to a QoS of an SLA.

Customer SLA can be impacted or comprised due to unintended configuration changes, malware attacks, and infrastructure breakdowns. The cloud service framework can detect when a QoS breakage occurs, and then manage and restore QoS according to the SLA dynamically or in flight to restore the service level that is indicated by a service policy.

Figure 1:
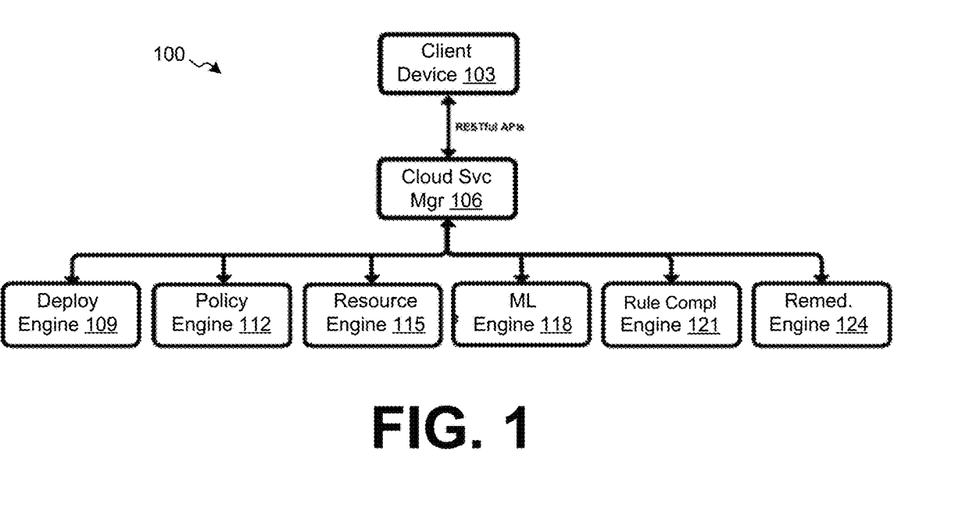
FIG. 1 is a drawing depicting components that provide a cloud service framework in a networked environment, according to embodiments of the present disclosure.

FIG. 1 shows examples of components of a cloud service framework. The cloud service framework can include a client device 103, a cloud service manager application 106, a deploy engine 109, a policy engine 112, a resource engine 115, a machine learning engine 118, a compliance engine 121, and a remediation engine 124, among other components.

The cloud service framework can include hybrid-cloud and multi-cloud environments. A hybrid cloud environment can include a network of privately owned or operated on-premises networked devices as well as networked devices provided by a service provider over a public wide area network such as the Internet. A multi-cloud environment can include networked devices provided by multiple different service providers that provide services over a public wide area network such as the Internet. Each of the service providers of a multi-cloud implementation can provide a "cloud" of networked devices that operate in concert.

In a hybrid cloud implementation, the client devices 103 can be part of a network of privately owned or operated on-premises networked devices. The cloud service manager application 106, the deploy engine 109, the policy engine 112, the resource engine 115, the machine learning engine 118, the compliance engine 121, the remediation engine 124, and other components can be executed by computing devices provided by a service provider over a public wide area network such as the Internet.

In a multi-cloud implementation, the client devices 103 can be provided by a first service provider over a public wide area network such as the Internet. The cloud service manager application 106, the deploy engine 109, the policy engine 112, the resource engine 115, the machine learning engine 118, the compliance engine 121, the remediation engine 124, and other components can be executed by computing devices provided by a second service provider over a public wide area network such as the Internet. An enterprise can employ or contract with the first service provider to perform actions and services described for the client devices 103. The enterprise can employ or contract with the second service provider to perform actions and services described for the cloud service manager application 106, the deploy engine 109, the policy engine 112, the resource engine 115, the machine learning engine 118, the compliance engine 121, the remediation engine 124, and other components.

The client device 103 can include software instructions that invoke APIs on behalf of an enterprise or customer. The client device 103 can include a UI-based or automatic API client device 103 that can invoke various APIs. The APIs can include RESTful APIs or any other APIs.

The cloud service manager application 106 can receive a customer request to deploy customer service with a given policy as requirements. It then uses the deploy engine 109 that identifies and prepares a policy-compliant environment to host the customer service. After service deployment, the on-going service compliance check and remediation are taken care of by the proposed framework that includes one or more of the components illustrated in the architecture shown in FIG. 1. In some cases, the compliance engine 121, machine learning engine 118, remediation engine 124, and other engines of the cloud service framework can be considered components of the cloud service manager application 106.

Policy engine 112: For a cloud computing environment, the policy engine 112 can be deployed with associated cloud requirements captured in a service policy to enforce Service Level Agreement (SLA). A service policy can be pre-provisioned by the cloud administrator or customized by the customer request. Among the available service policies, a service policy can be selected and specified to request for a cloud service deployment. For example, if all-flash storage is required by a cloud service, the enterprise customer can pick an all-flash-capable policy as part of the request to deploy the service on an all-flash environment.

In summary, the policy engine 112 is responsible for policy management (e.g., Create, Read, Update, Delete). A nonlimiting example of a service policy is provided below for illustrative purposes. As can be seen, the service policy can specify environment requirements which can include one or more of: an environment profile that specifies a specific type of environment that is to be provided; a performance profile that includes hardware performance metrics that are to be provided; a resource profile that indicates hardware resource requirements; a security profile that indicates a security compliance specification; and an isolation profile that indicates whether one or more aspects or components provided to the enterprise tenant using the cloud service can be shared with other tenants, such as whether software executed for one tenant can be executed within a same host, same VM, or same container as another enterprise tenant. The service policy can explicitly indicate APIs that are to be provided, for example, within the environment profile, or the APIs that can be identified based on an analysis of the service policy.

Table 1 provides an example cloud service policy specification. The cloud service policy can specify an environment, security setting, hardware specification, or other policy parameter that is associated with an API. Additional parameters can also be specified as discussed. The cloud service manager application 106 can identify a set of APIs that are to be deployed by the deployment engine to implement or provide cloud services according to the QoS parameters of the service policy.

TABLE 1

Cloud Service Policy Example

CloudServicePolicy {
// an example for illustration
  Profiles {

TABLE 1-continued

Cloud Service Policy Example

```
EnvironmentProfile {
    Environment environmentSpec; // VM, Container, Container + Kubeinetes (e.g replies, HA, etc.)
    ...
};
PerformanceProfile {
    Int numberOfReadsPerSecond;
    Int numberOfWritesPerSecond;
    Int readLatency;
    Int writeLatency
    ...
};
ResourceProfile {
    // CPU
    Int numCPUs;
    // Memory
    enum memoryType; // E.g. L1, L2, all-flash, etc.
    Int memorySize;
    // Storage
    enum storageType; // E.g. all-flash, FC, NFS, VVOL
    Int capacity;
    // Network
    ...
};
SecurityProfile {
    enum SecurityCompliance listOfSecurityCompliances; // E.g. FIPS 140-2, STIG, SRG, MITM
    ...
};
IsolationProfile {
    boolean shared; // true or false for tenant or traffic segregation
    ...
    };
 ..
};
```

Deploy engine 109: Once the customer specifies a service policy for the cloud service, the request can be passed on to the deploy engine 109. Based on a given policy, the deploy engine 109 can identify an existing environment (from inventory, topology, or discovery) or create a new one (if no compliant one is available) that is capable of hosting the customer service compliant to the Quality Of Service (QoS) specified in the service policy. In addition, the deploy engine 109 can deploy the services provided using any form of the specified environment (e.g., VM, Container, Container+ Kubernetes for replica, HA).

Resource engine 115: This component can be responsible for managing and reporting resources including READ and WRITE operations through existing mechanisms (e.g., resource public APIs published by the product resources).

Compliance engine 121: The compliance engine 121 can enforce compliance with machine learning based rules from the machine learning engine 118 and manually defined rules. Once a service deployment is deployed, customer business can continue with the respective QoS. Quality of Service can be affected by resource contention, traffic congestion, malicious viruses, and infrastructure breakdowns, among other issues. The compliance engine 121 can include components that check compliance with QoS and security requirements, including using a machine-learning and otherwise defined and detected anomalies such as those detected as a deviation from a baseline set of hardware performance metrics and events that match a pattern of a predefined security or failure event. The compliance engine 121 can detect issues so that an SLA can be restored quickly and efficiently. Multiple approaches can provide the service policy compliance check, including event/alert-driven and polling-driven approaches. In general, the compliance engine 121 can collaborate with the policy engine 112 and machine learning engine 118 to derive a list of non-compliances to be remediated.

Event/Alert-Based Approach: when a subscribed event or an alert is received, compliance check can be triggered to run against the impacted area. For example, when a service I/O timeout event is received, the compliance check may kick in to check the resources on the IO path for performance profile compliance as needed.

Polling-Based Approach: Compliance check can be invoked periodically against the service policy and the respective resources to identify any SLA breakage (e.g., any undesired value, certain security is comprised, unusual resource consumption rate). Polling-based check is triggered for a service in an on-going basis. Not necessary all the anomalies are the root causes. Some may be and others might the cascading victims. The compliance engine 121 incorporates pre-provisioned rule sets to come up with a remediation plan in terms of the root causes to be fixed and the remediation order.

Table 2 includes a sample compliance check specification for illustration where event-based and polling-based specifications can be specified. Polling-based attributes can be specified for on-going profile sampling.

TABLE 2

Compliance Check Example

```
ComplianceCheck{
    //rule-based+machine-learning-based compliance check
    //event-driven
    Map-ResourceType, EventType>passiveComplianceCheckMap; // event, alert driven approach -specify the scope of
monitoring in terms of what type of resource and what type of events
        //e.g. [("service","reboot"), ("IOPath", "Down"), ("identified security breach", "Disable a REST API")]
    //polling-driven
    Map<Map<ResourceType, Attribute>, Value desiredValue>activeComplianceCheckMap;
};
This is the high-level idea for rule sets and how they are applied for a given list of anomalies.
Loop for each in the anomaly list {
    Loop for each rule in the respective rule set{
        If(ruleEvaluation is True) {
            Action Set for True (condition is met)
        } else{
            Action Set for False (condition is NOT met)
        }
    }
}
Example 1
Loop for the identified anomalies (unusually low CPU consumption rate, unusually low Memory consumption rate, unusually
low IO Performance Numbers) {
    If (CPU anomaly) {
        check possible causes (e.g. over-subscription)
    }
If (Memory anomaly) {
    check possible causes (e.g. memory leaking)
}
If (IO Performance anomaly) {
    check possible causes (e.g. hit memory consumption limit, failures along the IO path, storage issues)
}
    After applying the above the rule sets, it can conclude the cause. The cause can be passed on to Remediation Engine to
take necessary remediations.
}
Example 2
Loop for identified anomalies (SecurityGuidline1,SecurityGuideline2, storage){
If(SecurityGuideline1 violation){
    check possible noncompliant causes
        *conclude unintended file update due to unauthorized permission by the malicious account
}
If(storage is at low capacity){
    Check possible causes (...)
    -conclude low storage capacity was caused by the first security violation
}
After applying the above the rule sets, It can conclude to delete the malicious account and conduct the necessary clean up.
The cause can be passed on to Remediation Engine to take indicated remediations
}
```

Machine learning engine 118: Machine Learning (ML) is incorporated into this solution. For polling-triggered approach, the respective profilings in IO, CPU, Memory, Storage, Thread, other resource consumptions (e.g., File Open, DB connection) can be conducted and analyzed via supervised learning periodically. Please refer to some sample CPU, memory, storage, and thread profilings below where consumption patterns are used as training and test data for supervised learning. Based on the corresponding profiling results, ML can self-train and self-learn to establish a baseline (e.g., in weighted measures or thresholds) and provide an ML output to make a recommendation. Similarly, a similar ML process can be conducted when an event or an alert is received. The generated ML output will be shared and incorporated by Compliance engine 121 to proceed further to check compliance.

Figure 2:
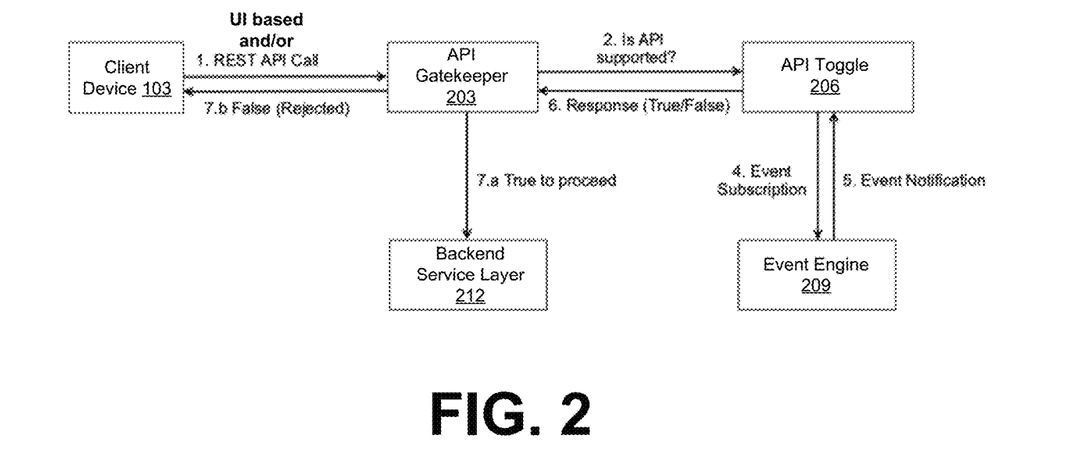
FIG. 2 is another drawing depicting components of the cloud service framework, according to embodiments of the present disclosure.

FIG. 2 shows an event-driven API toggle 206 functionality. Generally, this shows that when an API call is made from the client device 103 of FIG. 1, an API gatekeeper 203 can determine whether the API is supported and enabled within an API toggle 206 component. The API toggle 206 component can maintain a list or listing in any data structure of all APIs that are provided according to the SLA, and can also set a toggleable API availability status for each API in the listing. The API toggle 206 component can receive an event notification. The cloud service manager application 106 can include the API gatekeeper 203 and the API toggle 206 components.

The API toggle 206 component can identify that the event notification is associated with one or more of the APIs, and can toggle the affected APIs off once an anomaly or disabling condition is identified, for example, in order to prevent problematic or malicious activity while remedial actions are performed to bring a backend service layer 212 back into compliance. Once the remedial actions are performed and the anomaly or disabling condition is resolved. The API toggle 206 component can perform an event subscription or subscribe to an event notification service provided by the event engine 209. When an event such as anomalous activity or security breach is identified, the event engine 209 can transmit an event notification.

The API toggle 206 or API evaluation component can evaluate whether the API is enabled. This can include checking whether it is supported or unsupported by the SLA, and also checking whether the API is enabled or disabled according to the toggleable API availability status (e.g., toggled on or off), and can transmit a response to the API gatekeeper 203 component. The response can include a true/false response that indicates whether the API call is to be forwarded to the backend service layer 212 that provides cloud services according to the SLA, including APIs that can be invoked by the client device 103. If the toggleable API availability status indicates the API is enabled and therefore available for use, then the API toggle 206 component can return a response that indicates to forward the API call to the backend service layer 212. Otherwise, if the toggleable API availability status indicates the API is disabled, then the API toggle 206 component can return a response that indicates to prevent the API call from being forwarded.

Figure 3:
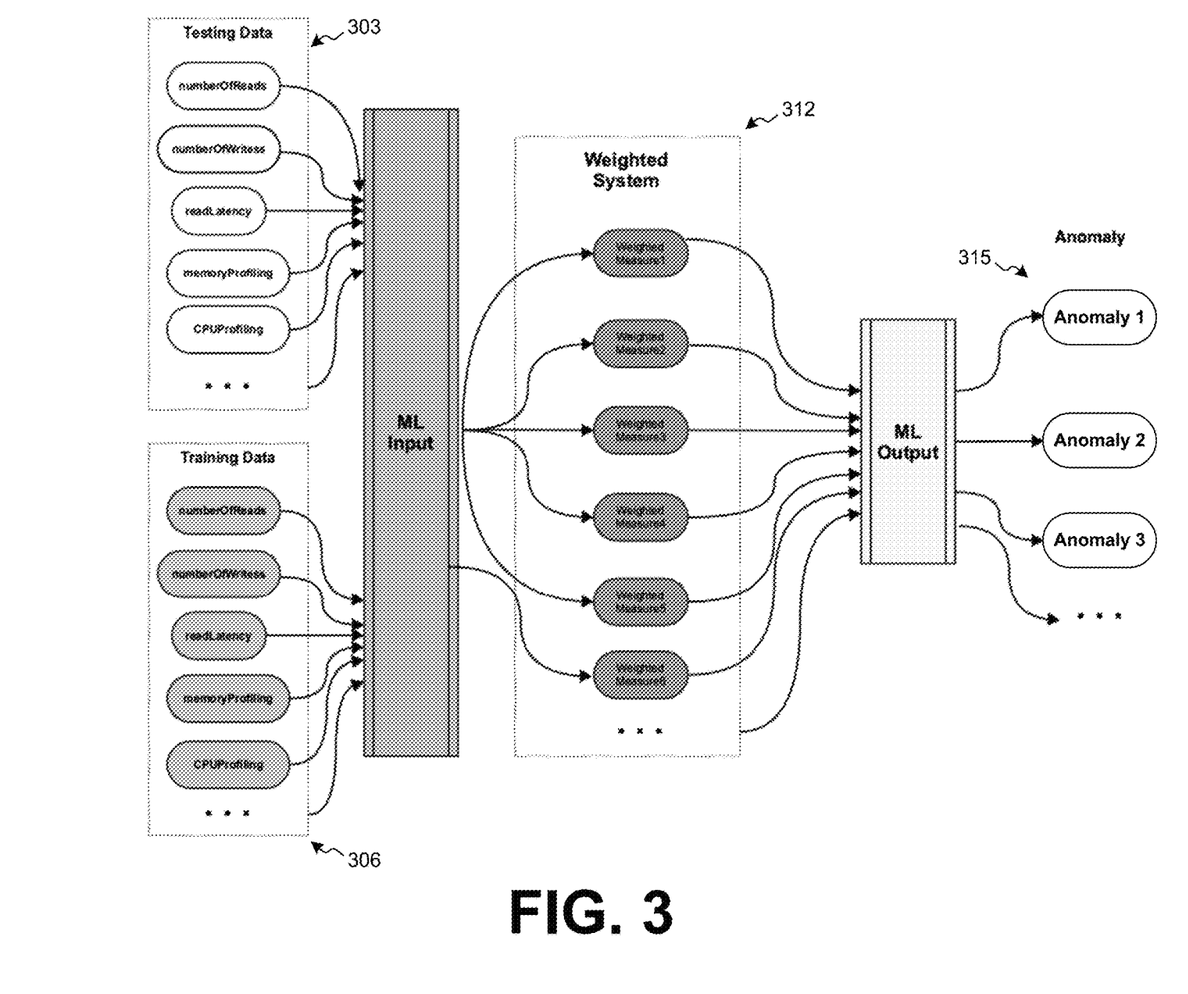
FIG. 3 is a drawing depicting a machine learning process for the cloud service framework, according to embodiments of the present disclosure.

FIG. 3 is a drawing depicting an example machine learning process performed by the machine learning engine 118 of the cloud service framework. The machine learning process can create and evaluate anomalies based on the parameters provided by the training data 306, testing data 303, and live activity of the cloud service framework. Once the machine learning process is trained to identify one or more anomalies based on the input parameters of the training data 306 and testing data 303, the event engine 209 can provide parameters identified based on live activity of the cloud service as machine learning inputs to the machine learning model to identify machine learning inputs that include specific anomalies or types of anomalies such as the anomalies 1, 2, and 3. The machine learning model can include a weighted system 312 that specifies a number of parameters against which the live machine learning inputs are processed to identify whether they correspond to machine learning outputs including one or more anomalies 315 of various types identified and defined through the training and testing process using the training data 306 and testing data 303. The live inputs can also be used to further train, verify, and tune the overall machine learning results.

The machine learning process can also associate the anomaly with one or more APIs, and can further associate the anomaly with one or more remedial actions to perform to bring a backend service layer 212 back into compliance. The machine-learned associations can be utilized by the event engine 209, the API toggle 206 component, and the remediation engine 124 to toggle off or disable APIs identified based on the event notification, as well as identify and perform remedial actions that are identified based on the event notification. The inputs to the machine learning process can include the parameters shown in the figure as well as other hardware, performance, usage, and security data detected by the compliance engine 121 and resource engine 115, as well as data from the SLA indicated in the service policy, and the API availability status data.

Figure 4:
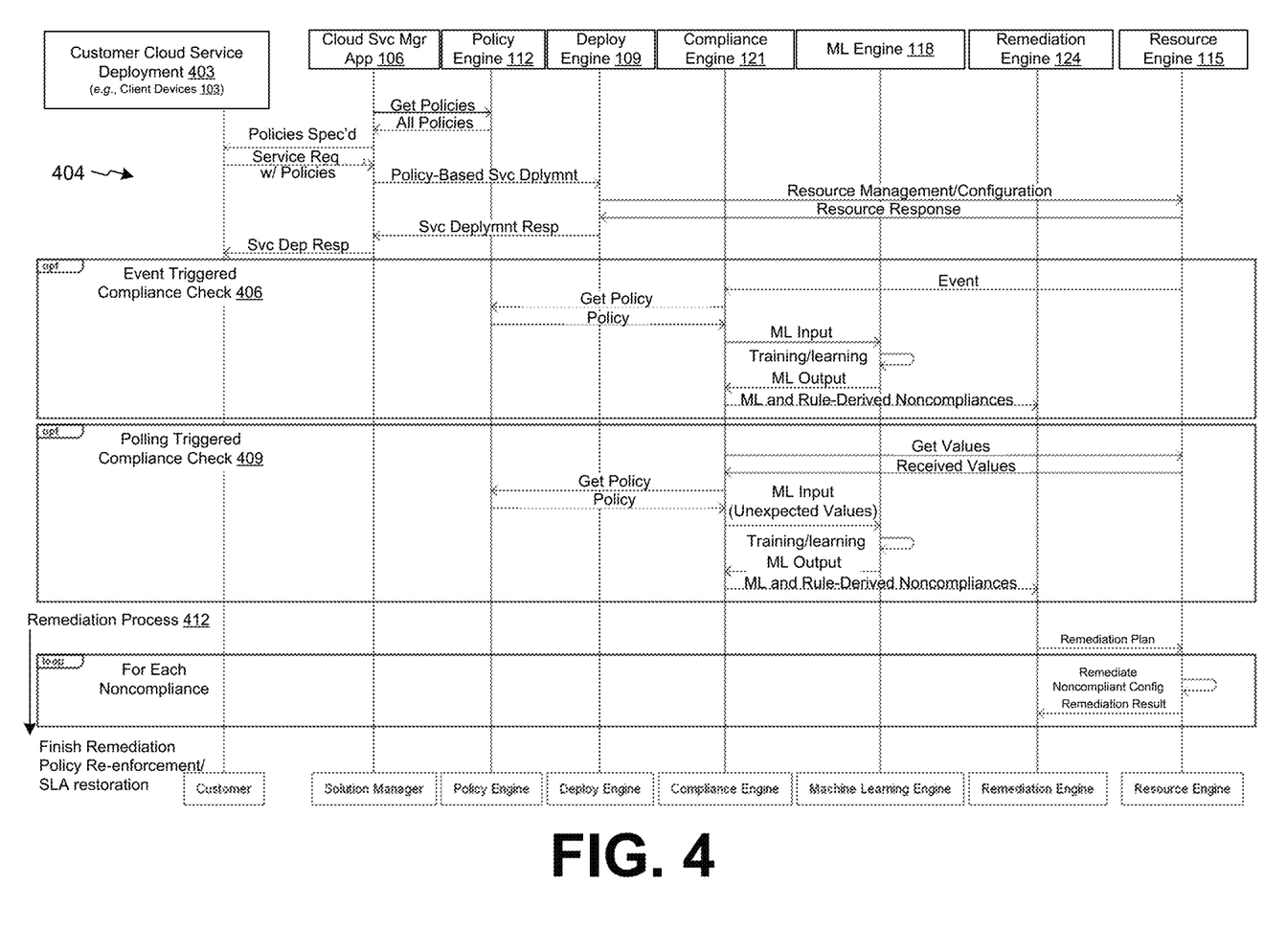
FIG. 4 is a sequence diagram depicting functionalities performed by components of the cloud service framework in the networked environment, according to embodiments of the present disclosure.

FIG. 4 is a sequence diagram depicting functionalities performed by components of the cloud service framework in the networked environment. The sequence diagram can include a policy definition and deployment process 404, an event-triggered compliance check 406, a polling-triggered compliance check 409, and a remediation process 412.

In the policy definition and deployment process 404, the cloud service manager application 106 can retrieve all available policies from the policy engine 112. The cloud service manager application 106 can provide the available policies to a customer to specify a set of policies for the customer cloud service deployment 403. The customer can use a client device 103 to select the policies through a user interface or management console. The cloud service manager application 106 can receive the specified policies for the customer cloud service deployment 403 and provide them to the deploy engine 109. The deploy engine 109 can identify available hardware resources provided by host devices, and apply a resource management and configuration to the host devices using the resource engine 115. Once the resource management and configuration is applied, the resource engine 115 can respond indicating that the resource management and configuration is applied successfully. The deploy engine 109 can then reply to the cloud service manager application 106 that the requested service deployment is applied according to the policies including a service level agreement. The cloud service manager application 106 can provide confirmation, for example, through the user interface or management console that the requested service deployment is applied according to the policies and a service level agreement.

The event-triggered compliance check 406 can include receiving an event detected by a resource engine 115. The event can include resource-based triggers such as network congestion or network usage that exceeds a threshold, host unavailability, and response time that exceeds a threshold. The resource triggers can include any hardware failure, but can also include deployment expansions and contraction events, and other resource triggers. Resource triggers can include an unexpected data access or an unexpected communication to or from an unknown network endpoint. The event can also include a user-initiated event such as a user input or command received through a user interface or management console.

Once an event is received, the policy engine 112 can retrieve policies for the customer cloud service deployment 403, and provide it to the compliance engine 121. The policies can specify a set of inputs from live deployment testing data 303 including values that should be read and input into the machine learning engine 118. In some cases, the compliance engine 121 can request specified values from the resource engine 115. In other cases, the resource engine 115 automatically provides a predetermined set of values or a superset of values that are used by all available policies along with the event notification. These machine learning inputs can be read and input into the machine learning engine 118, which can process the inputs as discussed, and provide a machine learning output including any anomalies that are detected. Each anomaly can be associated with a remediation plan that can be performed in the remediation process 412.

The polling-triggered compliance check 409 can include performing a compliance check periodically, according to a schedule. The compliance engine 121 can request a predetermined set of values from the resource engine 115. This can include a predetermined set of values or a superset of values that are used by all available policies along with the event notification. In other examples, the values to retrieve are specified in the policy, and the retrieval is performed after the policies are identified.

The policy engine 112 can retrieve policies for the customer cloud service deployment 403, and provide it to the compliance engine 121. The policies can specify a set of inputs from live deployment testing data 303 that should be read and input into the machine learning engine 118. These machine learning inputs can be read and input into the machine learning engine 118, which can process the inputs as discussed, and provide a machine learning output including any anomalies that are detected. Each anomaly can be associated with a remediation plan that can be performed in the remediation process 412.

The remediation process 412 can be performed once a non-compliance event is identified, for example, based on machine-learned anomaly events and rule-based compliance checks in the event-triggered compliance check 406 or polling-triggered compliance check 409. A remediation process 412 can include identification of a remediation plan based on the specific anomaly or event that is detected or identified.

The remediation plan can include suspending or toggling off a predetermined set of APIs, performing one or more remedial actions, checking whether compliance is restored, and enabling or toggling on the set of APIs according to the detected anomaly or event. In some examples, a notification can be provided to an enterprise administrator, and the administrator can toggle on the set of APIs. In other examples, the set of APIs can be automatically toggled on once compliance is restored.

Figure 5A:
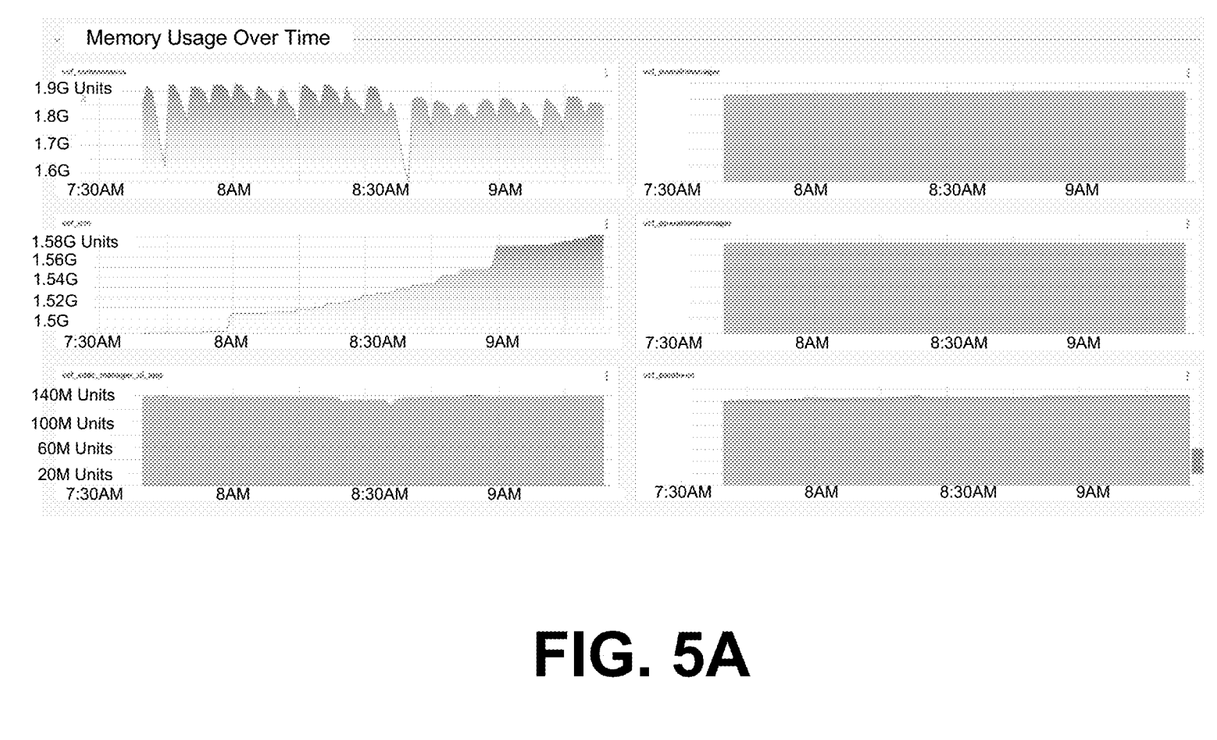
FIG. 5A is a drawing depicting memory profiling pattern graphs, according to embodiments of the present disclosure.
Figure 5B:
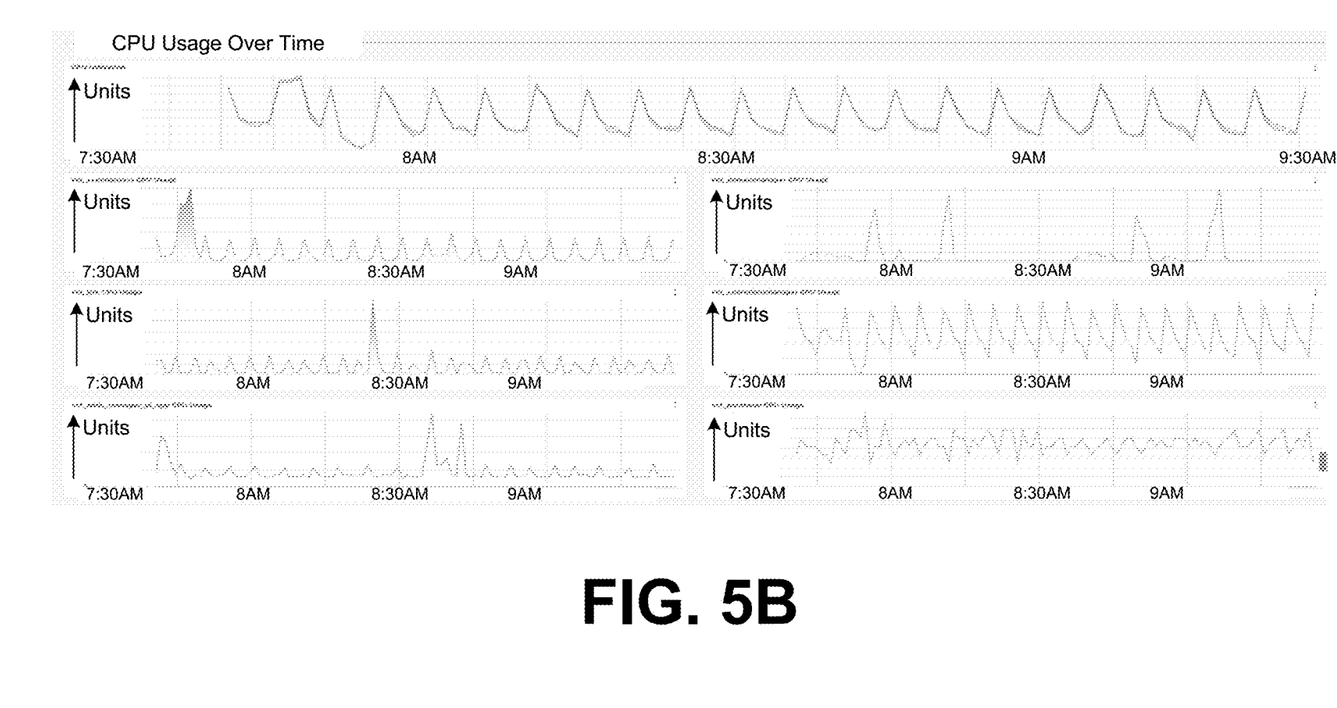
FIG. 5B is a drawing depicting CPU profiling pattern graphs, according to embodiments of the present disclosure.
Figure 5C:
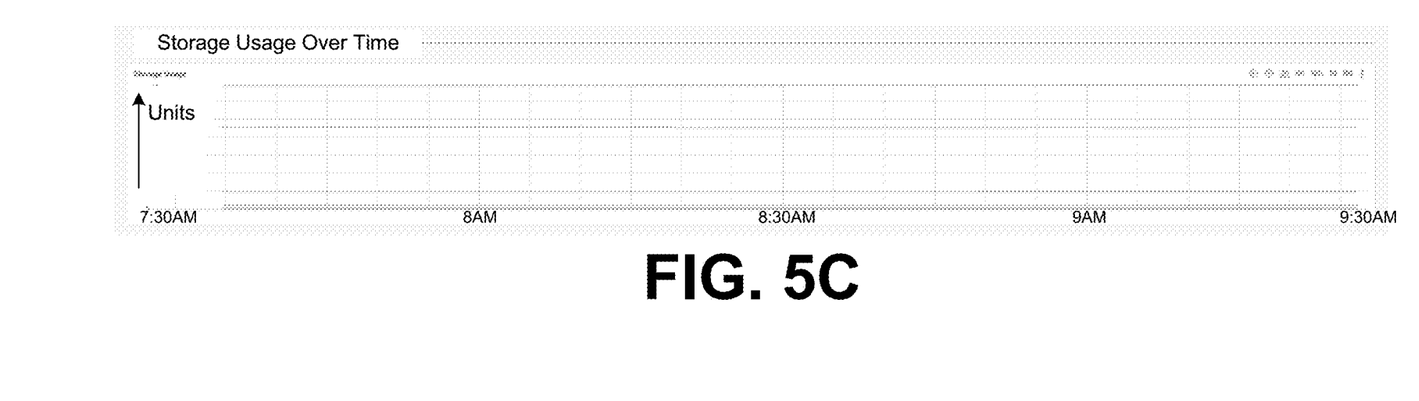
FIG. 5C is a drawing depicting storage profiling pattern graphs, according to embodiments of the present disclosure.
Figure 5D:
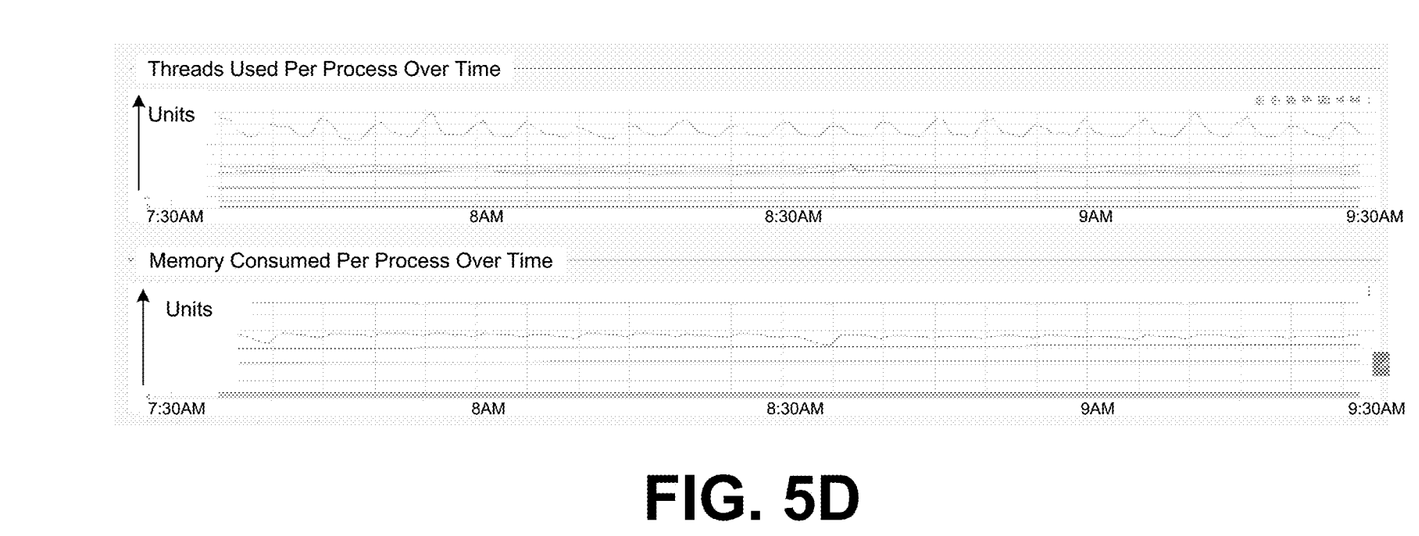
FIG. 5D is a drawing depicting thread profiling pattern graphs, according to embodiments of the present disclosure.

FIGS. 5A-5D are drawings depicting various profiling pattern graphs. Profiling snapshots to illustrate the idea of machine learning to understand the pattern and determine anomalies if any. The pattern graphs can be compared using numerical pattern profiling, visual or graphical pattern profiling, and other methods. In other words, machine-learned anomalies can be identified based on inputs that include memory profile patterns, CPU profiling patterns, storage profiling patterns, thread profiling patterns, and other hardware usage patterns. For example, FIG. 5A shows memory profiling pattern graphs. A memory profiling pattern graph can be created for a particular application, a particular workload including a set of applications, and for all processes executed by a set of one or more hardware hosts. FIG. 5B shows CPU profiling pattern graphs. FIG. 5C shows storage profiling pattern graphs. FIG. 5D shows thread and memory profiling pattern graphs.

Figure 6:
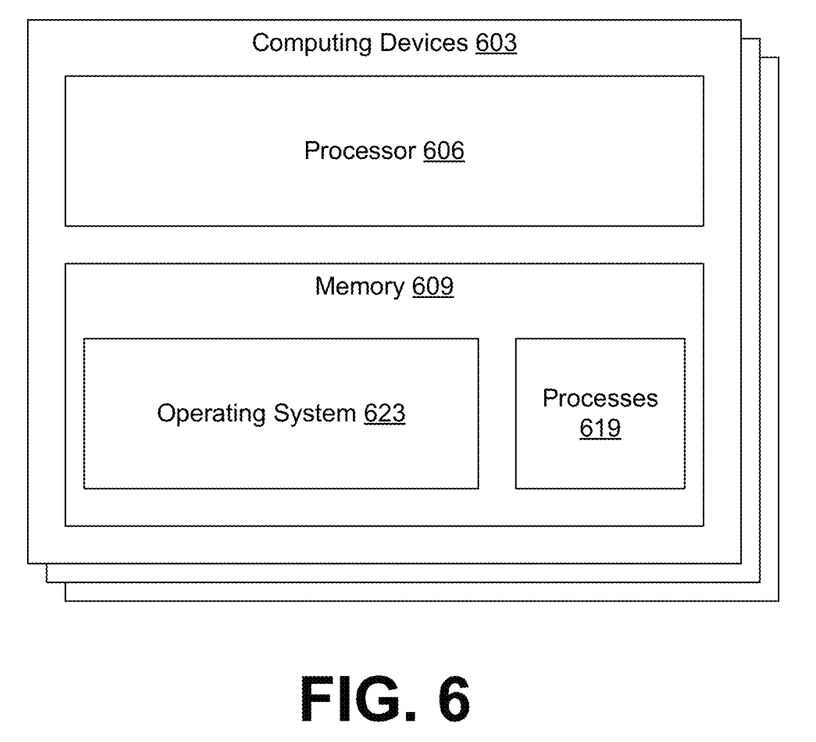
FIG. 6 is a drawing depicting a computing device for one or more of the components of the networked environment.

FIG. 6 depicts a schematic block diagram of one example of one or more computing devices 603 for the components of the networked environment of FIG. 1, according to various embodiments of the present disclosure. A computing device 603 can have one or more processors 606. The computing device 603 can also have a memory 609.

The processor 606 can represent any circuit or combination of circuits that can execute one or more machine-readable instructions stored in the memory 609 that make up a computer program or process and store the results of the execution of the machine-readable instructions in the memory 609. In some implementations, the processor 606 may be configured to perform one or more machine-readable instructions in parallel or out of order. This can be done if the processor 606 includes multiple processor cores and/or additional circuitry that supports simultaneous multithreading (SMT). Examples of a processor 606 can include a central processing unit (CPU), a graphics processing unit (GPU), a field-programmable gate array (FPGA), application specific integrated circuits (ASICs), etc.

The memory 609 can include both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory devices.

Various types of data and machine-readable instructions may be stored in the memory 609. For example, one or more processes 619 may be stored in the memory 609. In some implementations, an operating system 623 may also be stored in the memory 609.

A process 619 can represent a collection of machine-readable instructions stored in the memory 609 that, when executed by the processor 606 of the computing device 603, cause the computing device 603 to perform one or more tasks. A process 619 can represent a program, a sub-routine or sub-component of a program, a library used by one or more programs, etc. When a process requests access to a hardware or software resource for which it lacks permission to interact with, the process 619 can generate an interrupt and provide or send the interrupt to the operating system 623.

The operating system 623 can include any system software that manages the operation of computer hardware and software resources of the computing device 603. The operating system 623 can also provide various services or functions to computer programs, such as processes 619, that are executed by the computing device 603. Accordingly, the operating system 623 may schedule the operation of tasks or processes 619 by the processor 606, act as an intermediary between processes 619 and hardware of the computing device. The operating system 623 may also implement and/or enforce various security safeguards and mechanisms to prevent access to hardware or software resources by unprivileged or unauthorized users or processes 619.

The operating system 623 can also implement a virtual memory system that provides an abstract representation of the memory 609 available on the computing device 603, such as the RAM. Among the features provided by the virtual memory system are a per process 619 address space, which maps virtual addresses used by a process 619 to physical addresses of the memory 609. The processor's memory management unit (MMU) can translate these virtual addresses to physical addresses, when used. The operating system 623 can use the virtual memory system to present more memory 609 to individual processes 619 than is physically available.

A number of software components discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), persistent memory, hard drive, solid-state drive, Universal Serial Bus (USB) flash drive, memory card, optical disc such as compact disc (CD) or digital versatile disc (DVD), floppy disk, magnetic tape, or other memory components.

Memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, graphics processing units (GPUs), field-programmable gate arrays (FPGAs), or other components, etc. Such technologies are generally well known by those skilled in the art and, consequently, are not described in detail herein.

Flowcharts can be used to describe the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although flowcharts can show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
    at least one computing device comprising at least one processor
    at least one memory comprising instructions executable by the at least one processor, wherein the instructions, when executed, cause the at least one computing device to at least:
        receive, by a cloud service manager application, a noncompliance event identified based at least in part on a plurality of parameters detected from a service deployment comprising hardware resources and software resources provided by a cloud service according to a service level agreement (SLA);
        identify, by the cloud service manager application, an application programming interface (API) that is associated with the noncompliance event;
        disable, by the cloud service manager application, the API by updating an API availability status;
        receive, by the cloud service manager application, a request to invoke the API; and
        prevent, by the cloud service manager application, the API from being forwarded to a backend service that provides the API.

2. The system of claim 1, wherein the noncompliance event comprises a machine-learned noncompliance event.

3. The system of claim 2, wherein the machine-learned noncompliance event comprises an anomaly detected based at least in part on at least one hardware usage profiling pattern.

4. The system of claim 1, wherein the noncompliance event comprises a rule-derived non-compliance event.

5. The system of claim 1, wherein the instructions, when executed, cause the at least one computing device to at least:
    subscribe, by the cloud service manager application, to an event notification service of an event engine, wherein the noncompliance event is identified based at least in part on receiving an event notification from the event notification service.

6. The system of claim 1, wherein the instructions, when executed, cause the at least one computing device to at least:
    direct, by the cloud service manager application, at least one remedial action based on the noncompliance event;
    determine, by the cloud service manager application, that the service deployment is in compliance with the SLA; and
    enable, by the cloud service manager application, the API by updating the API availability status.

7. The system of claim 1, wherein the instructions, when executed, cause the at least one computing device to at least:
    receive, by the cloud service manager application, a second request to invoke the API; and
    forward, by the cloud service manager application, the API to the backend service that provides the API.

8. A non-transitory computer-readable medium comprising instructions executable by at least one processor of at least one computing device, wherein the instructions, when executed, cause the at least one computing device to at least:
    receive, by a cloud service manager application, a noncompliance event identified based at least in part on a plurality of parameters detected from a service deployment comprising hardware resources and software resources provided by a cloud service according to a service level agreement (SLA);
    identify, by the cloud service manager application, an application programming interface (API) that is associated with the noncompliance event;
    disable, by the cloud service manager application, the API by updating an API availability status;
    receive, by the cloud service manager application, a request to invoke the API; and
    prevent, by the cloud service manager application, the API from being forwarded to a backend service that provides the API.

9. The non-transitory computer-readable medium of claim 8, wherein the noncompliance event comprises a machine-learned noncompliance event.

10. The non-transitory computer-readable medium of claim 9, wherein the machine-learned noncompliance event comprises an anomaly detected based at least in part on at least one hardware usage profiling pattern.

11. The non-transitory computer-readable medium of claim 8, wherein the noncompliance event comprises a rule-derived non-compliance event.

12. The non-transitory computer-readable medium of claim 8, wherein the instructions, when executed, cause the at least one computing device to at least:
    subscribe, by the cloud service manager application, to an event notification service of an event engine, wherein the noncompliance event is identified based at least in part on receiving an event notification from the event notification service.

13. The non-transitory computer-readable medium of claim 8, wherein the instructions, when executed, cause the at least one computing device to at least:
    direct, by the cloud service manager application, at least one remedial action based on the noncompliance event;
    determine, by the cloud service manager application, that the service deployment is in compliance with the SLA; and
    enable, by the cloud service manager application, the API by updating the API availability status.

14. The non-transitory computer-readable medium of claim 8, wherein the instructions, when executed, cause the at least one computing device to at least:
    receive, by the cloud service manager application, a second request to invoke the API; and
    forward, by the cloud service manager application, the API to the backend service that provides the API.

15. A method performed by instructions executed by at least one processor of at least one computing device, the method comprising:
    receiving, by a cloud service manager application, a noncompliance event identified based at least in part on a plurality of parameters detected from a service deployment comprising hardware resources and software resources provided by a cloud service according to a service level agreement (SLA);
    identifying, by the cloud service manager application, an application programming interface (API) that is associated with the noncompliance event;
    disabling, by the cloud service manager application, the API by updating an API availability status;
    receiving, by the cloud service manager application, a request to invoke the API; and
    preventing, by the cloud service manager application, the API from being forwarded to a backend service that provides the API.

16. The method of claim 15, wherein the noncompliance event comprises a machine-learned noncompliance event.

17. The method of claim 16, wherein the machine-learned noncompliance event comprises an anomaly detected based at least in part on at least one hardware usage profiling pattern.

18. The method of claim 15, wherein the noncompliance event comprises a rule-derived non-compliance event.

19. The method of claim 15, wherein the instructions, when executed, cause the at least one computing device to at least:
   subscribe, by the cloud service manager application, to an event notification service of an event engine, wherein the noncompliance event is identified based at least in part on receiving an event notification from the event notification service.

20. The method of claim 15, wherein the instructions, when executed, cause the at least one computing device to at least:
   direct, by the cloud service manager application, at least one remedial action based on the noncompliance event;
   determine, by the cloud service manager application, that the service deployment is in compliance with the SLA; and
   enable, by the cloud service manager application, the API by updating the API availability status.

* * * * *